US007395432B2

(12) United States Patent
Lee et al.

(10) Patent No.: US 7,395,432 B2
(45) Date of Patent: Jul. 1, 2008

(54) METHOD OF EMBEDDING/DETECTING DIGITAL WATERMARK AND APPARATUS FOR USING THEREOF

(75) Inventors: Jung-Soo Lee, Seoul (KR); Jong-Uk Choi, Seoul (KR)

(73) Assignee: Markany, Inc., Seoul (KR)

( * ) Notice: Subject to any disclaimer, the term of this patent is extended or adjusted under 35 U.S.C. 154(b) by 853 days.

(21) Appl. No.: 10/312,025

(22) PCT Filed: Apr. 13, 2002

(86) PCT No.: PCT/KR02/00679

§ 371 (c)(1),
(2), (4) Date: Sep. 9, 2003

(87) PCT Pub. No.: WO02/087250

PCT Pub. Date: Oct. 31, 2002

(65) Prior Publication Data

US 2004/0049680 A1 Mar. 11, 2004

(30) Foreign Application Priority Data

Apr. 13, 2001 (KR) ............................ 2001-0019922

(51) Int. Cl.
*H04L 9/00* (2006.01)
*H04K 1/00* (2006.01)
*G06F 17/14* (2006.01)

(52) U.S. Cl. ..................... 713/176; 708/402; 382/250

(58) Field of Classification Search ................... None
See application file for complete search history.

(56) References Cited

U.S. PATENT DOCUMENTS 5,768,426 A * 6/1998 Rhoads ..................... 382/232
5,905,800 A * 5/1999 Moskowitz et al. ........... 380/28
6,209,094 B1 * 3/2001 Levine et al. ............... 713/176
6,219,634 B1 * 4/2001 Levine ..................... 704/200.1

(Continued)

FOREIGN PATENT DOCUMENTS

EP 0 962 886 A2 12/1999

(Continued)

OTHER PUBLICATIONS

Djurovic, I., Stankovic, S., Pitas, I., Stankovic, LJ., and Tilp, J., "*Generalization of the Fourier Domain Watermarking to the Space/Spatial-Frequency Domain*", First Int'l Workshop on Image and Signal Processing and Analysis, Jun. 14-15, 2000, pp. 47-51, Pula, Croatia.

*Primary Examiner*—Christopher A Revak
(74) *Attorney, Agent, or Firm*—Senniger Powers LLP (57) ABSTRACT

A watermark is embedded in spatial domain. However, the same effect as the watermark is embedded in frequency domain is obtained by inverse frequency transforming the watermark, and then embedding it. By doing that, robustness of the watermark is enhanced in comparison with conventional method for generating a watermark and adding it in spatial domain. Also, the watermark can be detected, even though an image is passed through stirmark, by enlarging the size of the watermark generated by inverse frequency transforming through re-sampling.

In detecting the watermark, by high frequency filtering the watermarked image and getting all blocks of the watermarked image together, the effect of removing image component is obtained. Thereby, the detection speed of the watermark is improved, and the detection rate is increased as well.

25 Claims, 11 Drawing Sheets

U.S. PATENT DOCUMENTS

| | | | | |
|---|---|---|---|---|
| 6,320,965 B1 * | 11/2001 | Levine | ......................... | 380/34 |
| 6,330,673 B1 * | 12/2001 | Levine | ....................... | 713/176 |
| 6,345,100 B1 * | 2/2002 | Levine | ....................... | 380/205 |
| 6,823,455 B1 * | 11/2004 | Macy et al. | ................. | 713/176 |

FOREIGN PATENT DOCUMENTS

| | | |
|---|---|---|
| EP | 0 967 803 A2 | 12/1999 |
| EP | 0 962 886 A3 | 8/2001 |
| EP | 0 967 803 A3 | 10/2001 |

* cited by examiner

| 0 | -1 | 0 |
|---|----|---|
| -1 | 5 | -1 |
| 0 | -1 | 0 |

| -1 | -1 | -1 |
|----|----|----|
| -1 | 9 | -1 |
| -1 | -1 | -1 |

| 1 | -2 | 1 |
|---|----|---|
| -2 | 5 | -2 |
| 1 | -2 | 1 |

HIGH BOOST MASK

Fig. 6b

| -1 | -1 | -1 |
|----|----|----|
| -1 | 8 | -1 |
| -1 | -1 | -1 |

| 0 | -1 | 0 |
|---|----|---|
| -1 | 4 | -1 |
| 0 | -1 | 0 |

LAPLACIAN MASK

Fig. 6c

| 0  | 0  | -1 | -1 | -1 | 0  | 0  |
|----|----|----|----|----|----|----|
| 0  | -2 | -3 | -3 | -3 | -2 | 0  |
| -1 | -3 | 5  | 5  | 5  | -3 | -1 |
| -1 | -3 | 5  | 16 | 5  | -3 | -1 |
| -1 | -3 | 5  | 5  | 5  | -3 | -1 |
| 0  | -2 | -3 | -3 | -3 | -2 | 0  |
| 0  | 0  | -1 | -1 | -1 | 0  | 0  |

| 0  | 0  | 0  | -1 | -1 | -1 | 0  | 0  | 0  |
|----|----|----|----|----|----|----|----|----|
| 0  | -2 | -3 | -3 | -3 | -3 | -3 | -2 | 0  |
| 0  | -3 | -2 | -1 | -1 | -1 | -2 | -3 | 0  |
| -1 | -3 | -1 | 9  | 9  | 9  | -1 | -3 | -1 |
| -1 | -3 | -1 | 9  | 19 | 9  | -1 | -3 | -1 |
| -1 | -3 | -1 | 9  | 9  | 9  | -1 | -3 | -1 |
| 0  | -3 | -2 | -1 | -1 | -1 | -2 | -3 | 0  |
| 0  | -2 | -3 | -3 | -3 | -3 | -3 | -2 | 0  |
| 0  | 0  | 0  | -1 | -1 | -1 | 0  | 0  | 0  |

DoG MASK

| 0  | 0  | 0  | -1 | 0  | 0  | 0  |
|----|----|----|----|----|----|----|
| 0  | 0  | 0  | -1 | 0  | 0  | 0  |
| 0  | 0  | 0  | -1 | 0  | 0  | 0  |
| -1 | -1 | -1 | 13 | -1 | -1 | -1 |
| 0  | 0  | 0  | -1 | 0  | 0  | 0  |
| 0  | 0  | 0  | -1 | 0  | 0  | 0  |
| 0  | 0  | 0  | -1 | 0  | 0  | 0  |

METHOD OF EMBEDDING/DETECTING DIGITAL WATERMARK AND APPARATUS FOR USING THEREOF

TECHNICAL FIELD

The present invention relates to a method for recording and detecting a digital watermark in digital multimedia contents and an apparatus using the same. More particularly, the present invention relates to a digital watermark recordation and detection method and a recordation and detection apparatus using the same for transforming a watermark, embedding, recording, and detecting the watermark in a spatial domain to improve a process speed.

BACKGROUND ART

Recently, together with the wide spreading of the internet and computers and the rapid distributions of multimedia data, illegal copies (piracy) and distributions are widely prevalent so that an effective protection apparatus for a copyright to multimedia data gets required. Watermarking technology is one that embeds user information (watermark), unrecognizable by a user, in multimedia data, to thereby prevent pirated copies and protect a copyright of a copyright owner.

The watermark means a mark developed in a step using a frame for pressing wet fibrous material to get rid of water in a process making paper from papyrus in ancient times. Marks embedded in paper in order for paper manufacturers in the middle ages to prove their own goods are the watermarks in the middle ages, and, nowadays, an image is embedded which can be recognized only with light when, in a process of making banknotes, printing on both sides of a sheet of paper after drying the wet sheet on which printing has been done, and the image is referred to as a watermark.

In these days, together with the increase of digital media, the concept of a digital watermark has appeared. Just as paper in an analog concept is substituted with the concept of digital paper, digitalizing all the analog media in which the past watermarks were embedded has brought into the concept of the digital watermark as a mark hidden in digital images, audio, video, and so on. That is, the watermarking refers to all technical methods hiding and extracting a special form of watermark in multimedia contents in order to protect a series of multimedia contents. At the beginning, researches have been carried out for methods hiding original multimedia contents themselves, but, at present, it is a trend that strong watermarking technologies using lots of technical transform methods are developing.

The watermarking is classified into a visible watermarking and an invisible watermarking based on the visibility of a watermark, and the invisible watermarking is again classified into a spatial domain watermarking and a frequency domain watermarking based on the methods embedding a watermark.

The visible watermarking specifies a copyright by embedding in an original image author information which can be recognized with eyes. The visible watermarking can be used with ease but has a drawback in that the originals are damaged.

Accordingly, the invisible watermarking is primarily used in the image watermarking technology in these days. The invisible watermarking is a technology embedding a watermark not to be visually perceived by using a limit of senses of the human visual system. While the spatial domain watermarking embeds and extracts a watermark with ease, there is a high possibility to lose a watermark by means of signal processing, video processing (non-linear filtering, rotating, cutting, moving, enlarging, and reducing transforms and the like), and compressing.

However, the frequency domain watermarking employs transform techniques such as Fourier transform, discrete cosine transform, or the like for embedding and extraction, so there exists a drawback in that it has a complicated algorithm and requires lots of arithmetic operations, but it has an advantage in that it is robust on general attacks such as filtering or compressions.

The invisible embedding of a watermark requires an embedding of the same in a low value on a broad area, which is carried out by the spread spectrum technology of Ingemar J. Cox. In the spread spectrum technology, a pseudo-random sequence is used as a watermark, which is a method that can be effectively used since the sequence has a uniform distribution function and is evenly distributed over the entire bandwidth of frequencies.

For methods transforming an original image into a frequency domain, the fast Fourier transform (FFT), discrete cosine transform (DCT), and wavelet transform are generally utilized a lot, which takes a method embedding and restoring a watermark into the original state in a transform plane. However, the method has a high possibility to lose a watermark on attacks such as image rotating, cutting, moving, enlarging, reducing, or the like.

As stated above, the watermarking methods in the spatial domain or frequency domain have advantages and disadvantages in their own ways. For an alternative, a watermarking method using the log-polar mapping and Fourier transform has been developed to compensate for the loss of a watermark, which is the weak point of the frequency domain watermarking method, in rotating, enlarging, or reducing an image. The method converts rotations, enlargements, and reductions into a simple movement forms through the log-polar mapping and detects a watermark by using the characteristics that the amplitudes of the Fourier transform are invariable with movements. However, the method is weak at the video processing such as compressions and has a drawback in that a big video and watermark loss exists.

As mentioned above, the developed watermarking technologies for video have advantages and disadvantages in general in their own ways. Further, the pseudo-random sequence watermark being widely used at present can confirm what key value a watermark embedded in an image has, but has difficulties in embedding and extracting various copyright information.

Furthermore, the anti-watermarking as a by-product, come up during the watermark researches, causes a problem, which attacks by diverse methods and incapacitates a watermark embedded in an image, and main products for the anti-watermarking are StirMark, UnZign, and so on, for example.

For reference, the StirMark is one of the products for removing a watermark (anti-watermarking), and the StirMark attack randomly transforms an image, like meshwarping the image, to slightly transform arbitrary pixel positions and cut out part of the image, to thereby destroy the watermark.

DETAILED DESCRIPTION OF THE INVENTION

It is an object of the present invention to combine the spatial domain method and the frequency domain method to facilitate the embedding and extraction of a watermark and design to be robust on video transforms.

It is another object of the present invention to carry out the inverse frequency transform as to a watermark in a spatial domain without any processing through a transform in a frequency domain to embed and detect the watermark, to thereby improve a processing speed.

In particular, an object of the present invention is to become robust on the StirMark and the like which are programs removing a watermark and to satisfy the speediness and accuracy in embedding and detecting the watermark.

In order to achieve the above objects, a digital watermark embedding method for embedding a digital watermark in an image signal according to the present invention comprises steps of using a user key and an inherent key and generating respective pseudo-noise codes thereof; adding the pseudo-noise code generated based on the user key and the pseudo-noise code generated based on the inherent key; applying an inverse Discrete Cosine Transform to an added pseudo-noise code to generate a digital watermark; and adding the digital watermark and the image signal.

Further, the digital watermark detection method according to the present invention, in a method for detecting a digital watermark embedded in an image signal, comprises steps of using a user key and an inherent key and generating respective pseudo-noise codes thereof; applying an inverse Discrete Cosine Transform to each of the pseudo-noise code generated based on the user key and the pseudo-noise code generated based on the inherent key; scaling the converted signal into a certain size and forming a digital watermark; calculating a correlation between the digital watermark and the image signal; and detecting a watermark embedded in the image signal from the correlation.

As stated above, the present invention embeds a watermark in a spatial domain like a method embedding a watermark in the existing spatial domain, but a watermark is embedded through the inverse frequency transform, so that the same effect as embedding a watermark in the frequency domain is obtained. By doing so, the robustness of a watermark can increases compared to a method simply producing and adding a watermark in the existing spatial domain. In addition, a watermark is made by enlarging by means of resampling the size of a watermark produced through the inverse frequency transform, so the watermark can be detected even from an SirMarked image.

Further, unlike the existing methods, in detecting a watermark according to the present invention, high-frequency filtering is applied to a watermarked image, and all the blocks of the watermarked image are added to obtain an effect removing image components, so a watermark detection speed is enhanced as well as a watermark detection rate is increased.

Furthermore, the digital image watermarking apparatus and method according to the present invention employ a sharpness degree, a maximum value, and its position in use of the fourth moment (Kurtosis) in the correlation of a user key value and a watermark, featuring maximizing watermark detections and the authentication accuracies.

BRIEF DESCRIPTION OF THE DRAWINGS

The above objects and other features of the present invention will become more apparent by describing in detail a preferred embodiment thereof with reference to the attached drawings, in which:

FIG. 6 is an exemplary view for showing filters serving watermark detections, wherein

Hereinafter, the watermark embedding and detection method and the watermark embedding and detection apparatus using the same according to the present invention are described in detail with reference to the accompanying drawings.

Embodiment

Figure 1:
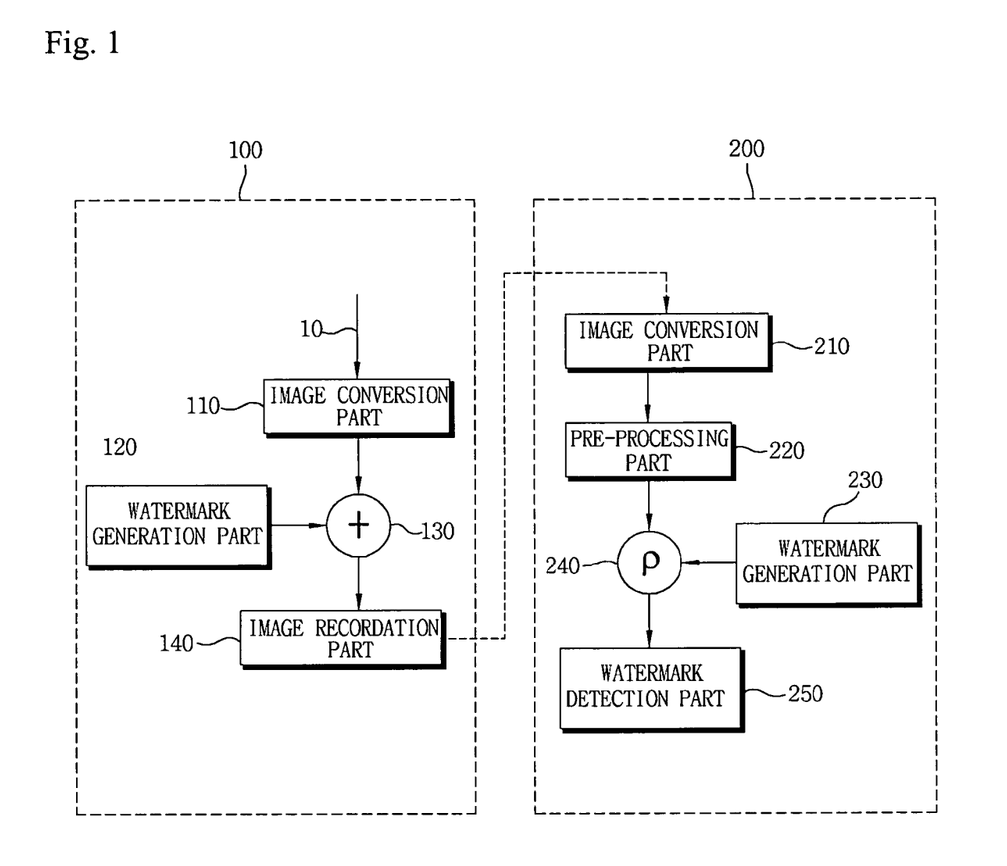
FIG. 1 is a block diagram for schematically showing a structure of a digital watermark embedding and detection apparatus according to an embodiment of the present invention.

FIG. 1 is a block diagram for schematically showing a structure of a digital watermark embedding and detection apparatus according to an embodiment of the present invention.

The digital watermark embedding and detection apparatus in FIG. 1 has a watermark embedding apparatus 100 and a watermark detection apparatus 200. The watermark embedding apparatus 100 includes an image conversion part 110 converting an inputted image 10 into a certain form based on characteristics thereof, a watermark generation part 120 generating a watermark, an adder 130 adding a watermark generated from the watermark generation part 120 to an image signal outputted from the image conversion part 110, and an image recordation part 140 recording a watermark-embedded image signal.

Further, the watermark detection apparatus 200 includes an image conversion part 210 receiving a image signal and converting it into a format of a certain form, a pre-processing part 220 strengthening the characteristics of a watermark included in an output signal of the image conversion part 210, a watermark generation part 230 generating a watermark, a correlation calculation part 240 calculating a correlation between a signal having the strengthened watermark characteristics included in the image signal and a watermark outputted from the watermark generation part 230, and a watermark detection part 250 detecting a watermark included in an image signal based on an output value from the correlation calculation part.

The operations in the watermark embedding and detection apparatus having the above structure are described with respective constituents thereof. First, the operations of the watermark embedding apparatus 100 are described with reference to FIG. 2 to FIG. 4.

Figure 2:
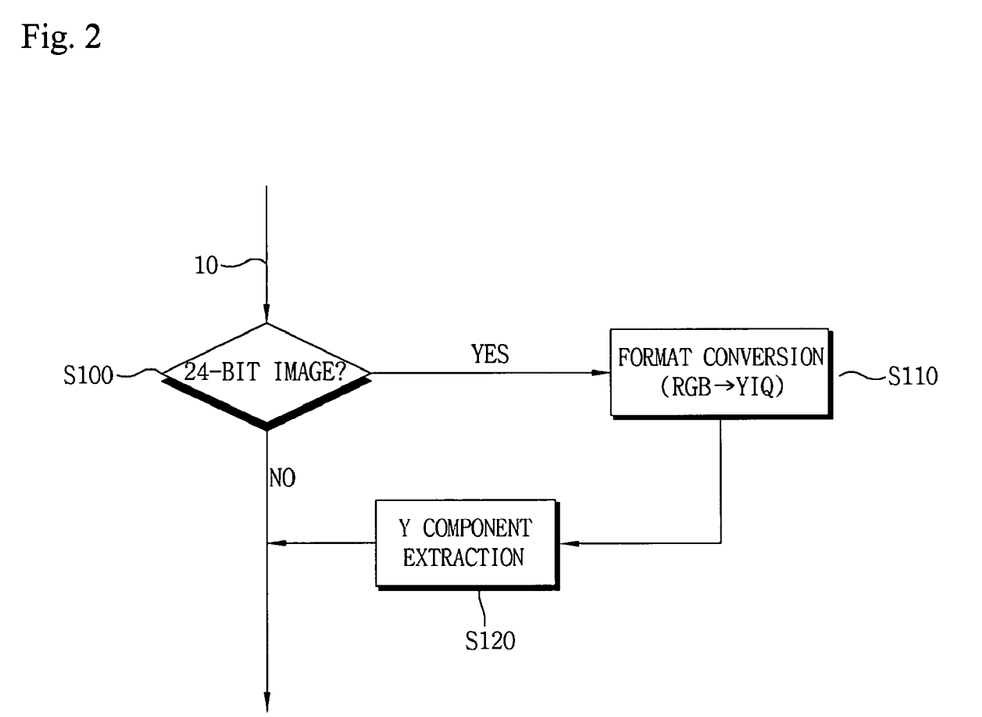
FIG. 2 is a view for showing operation flows of an image conversion part of a watermark embedding apparatus of FIG. 1.

An image 10 is inputted to the image conversion part 110 to embed a watermark in a digital image signal. Describing the operation flows of the image conversion part 110 with reference to FIG. 2, the image conversion part 110 checks whether the inputted image 10 is a 24-bit color image (Step S100). If the inputted image is in the 24-bit color, the RGB components of the inputted image is converted into a model of a YIQ format by using formula 1 below (Step S110), wherein Y stands for Luminance, I for In phase, and Q for Quadrature.

$$\begin{bmatrix} Y \\ I \\ Q \end{bmatrix} = \begin{bmatrix} 0.2989 & 0.587 & 0.114 \\ 0.5959 & -0.2744 & -0.3216 \\ 0.2115 & -0.5229 & 0.3114 \end{bmatrix} \begin{bmatrix} R \\ G \\ B \end{bmatrix} \quad \text{[Formula 1]}$$

The I and Q components in the model of the converted format are separately stored, and only the Y component is extracted for scaling (Step S120). The extracted Y component passes over, for a next process, to a step embedding a watermark.

In the step S100, if the inputted image is not a 24-bit color image, the process passes directly over to the step embedding a watermark. That is, if the inputted image is not the 24-bit color image, the image 10 actually inputted corresponds to the same signal as the Y component of the 24-bit case, so the watermark embedding step is directly carried out without any conversion process into the YIQ format. Accordingly, if the inputted signal is not the 24-bit, no separate image conversion part 110 can be provided. Further, in the above case, an RGB input image is converted into the YIQ format and processed, but a watermark may be embedded in each of the R, G, and B channels.

Figure 3:
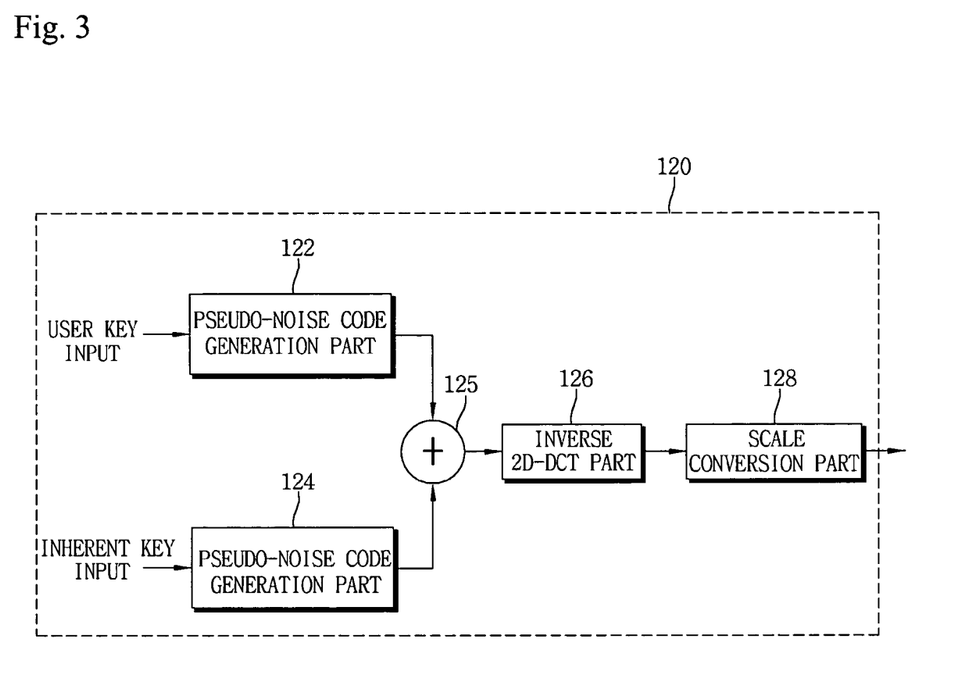
FIG. 3 is a block diagram for schematically showing a structure of a watermark generation part of the watermark embedding apparatus of FIG. 1.

At the same time the image is inputted to the image conversion part 110 as stated above, the watermark generation part 120 generates a watermark based on a structure shown in FIG. 3. First, if a user key is inputted to a pseudo-noise code generation part 122, the user key is used for a seed value to generate a pseudo-noise code. Moreover, besides the user key, an inherent key which has been generated for easily detecting a watermark is inputted to the pseudo-noise code generation part 124 to generate a pseudo-noise code in the same way.

The two pseudo-noise codes so generated are transferred to an adder 125 for an addition thereof. The added noise codes are inputted to an inverse 2D-DCT part 126 for the inverse frequency transform, that is, an inverse DCT transform. The inverse DCT transform as to such noise codes can generate the same effect as embedding a watermark in a frequency domain without converting a signal into a frequency domain. By doing so, a watermark becomes robust on diverse image variations.

That is, in conventional arts, an inputted image is converted to a frequency domain through the DCT and then embedded with a watermark, and the watermark-embedded image is converted to a spatial domain through the inverse DCT. However, on the side of a watermark, it simply shows that there is a processing step through the inverse DCT. Accordingly, the present invention can have the same effect as embedding a watermark in a frequency domain if the watermark is designed in consideration of the frequency domain to be embedded, even though carrying out the inverse DCT as to the watermark and embedding the inverse DCTed watermark in a spatial domain.

A watermark so generated undergoes a resampling for a size larger than that of an original watermark through a scale conversion part 128. The resampled watermark is outputted to be added to the image signal outputted from the image conversion part 110. The resampling of a watermark is for adjusting a size difference with an image block to be added.

The adder 130 first divides an image into blocks of a certain size, that is, a watermark size, to add a watermark generated from the watermark generation part 120 to an image signal outputted from the image conversion part 110. The divided image signal is added to the watermark signal with an application of a value adjusting a watermark strength. A method adding a watermark is to embed a watermark in an Y component through a format conversion in case of a R, G, and B 24-bit image. Further, a watermark can be independently and directly embedded, if not passing through the image conversion part 110, into every channel, that is, a gray image into the gray channel, and an RGB image (24-bit) into each of the R, G, and B channels. If a watermark-embedded signal is outputted, the signal is inputted to the image recordation part 140 and stored in a watermarked image.

Figure 4:
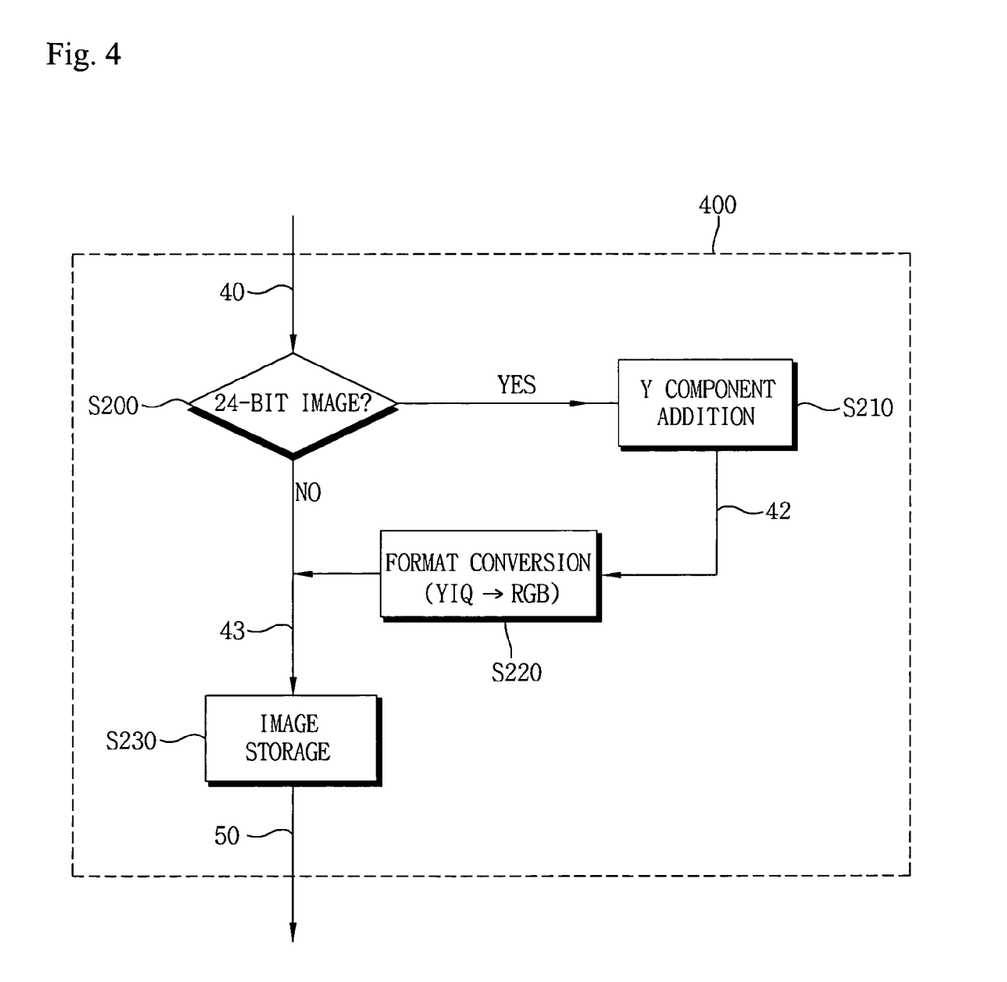
FIG. 4 is a view for showing operation flows of an image recordation part of the watermark embedding apparatus of FIG. 1.

The recording operations in the image recordation part 140 are described with reference to FIG. 4. The image recordation part 140 determines whether the watermark-embedded signal is a 24-bit image or not (Step S200). If the watermark-embedded signal is a 24-bit image, the previous IQ components left after having extracted the Y component from the YIQ components are added to the Y component (Step S210). Following the addition, a signal of the YIQ format is again converted into the RGB signal by using Formula 2 as follows (Step S220).

$$\begin{bmatrix} R \\ G \\ B \end{bmatrix} = \begin{bmatrix} 1.0 & 0.956 & 0.621 \\ 1.0 & -0.272 & -0.647 \\ 1.0 & -1.106 & 1.703 \end{bmatrix} \begin{bmatrix} Y \\ I \\ Q \end{bmatrix} \quad \text{[Formula 2]}$$

A signal converted as above is stored in a storage medium in a watermarked image (Step S230).

However, if the watermarked signal is not a 24-bit image in the step S200, the step 230 directly proceeds for storage since the watermarked signal is a signal inputted from the preceding image conversion part 110 without a separate conversion step so that the above conversion is unnecessary. Further, even in case that a watermark is embedded in every channel process by the processing of the RGB format instead of converting an inputted image into the YIQ format, the step S230 directly proceeds for storage.

The watermark embedding apparatus 100 as stated above, when generating a watermark, carries out the inverse frequency transform as to the watermark and directly embeds the watermark in the spatial domain, enabling to produce the same effect as embedding a watermark in the frequency domain, and also the apparatus 100 can directly embed a watermark in the spatial domain to reduce the frequency transform steps required every time with respect to an image block by block, bringing an effect improving a speed for embedding a watermark.

Further, the watermark detection apparatus detecting a watermark from the watermark-embedded image signal as above is described with reference to FIG. 1.

A watermarked image can flow into a pirate or an illegal user via various ways, be pirated, and be modified. However, a watermark generated by the watermark embedding apparatus 100 according to the present invention is robust enough to maintain a form of a watermark embedded in an image against a program such as SirMark or the like, and, hereinafter, a apparatus and a method for detecting a watermark recorded by such a manner are described.

If an image in which a watermark is embedded and recorded enters the watermark detection apparatus 200, the image is first converted into a signal of a certain form through the image conversion part 210. The structure and operations of the image conversion part 210 in the watermark detection apparatus 200 is the same as those of the image conversion part 110 in the watermark embedding apparatus 100. That is, if an inputted image is a 24-bit image, the inputted image is converted into the YIQ format from the RGB format, only the Y component is extracted and outputted to detect a watermark. If not a 24-bit image, the inputted image is outputted without the conversion. Further, if the inputted image is in 24 bits, the RGB signal form can be outputted as it is.

Figure 5:
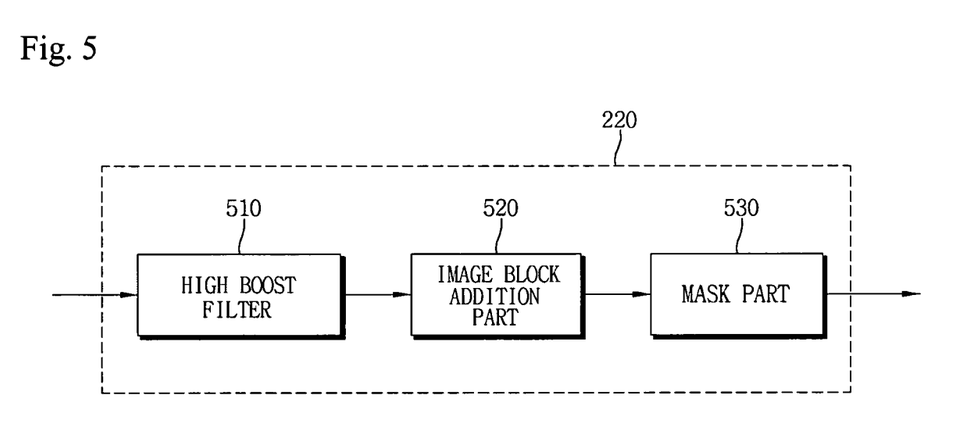
FIG. 5 is a block diagram for schematically showing a structure of a pre-processing part of a watermark detection apparatus of FIG. 1.

An image signal outputted from the image conversion part 210 is inputted into the pre-processing part 220. The pre-processing part 220 is for emphasizing the characteristics of a watermark included in the image signal, which is structured, as shown in FIG. 5, with a high boost filter 510, an image block addition part 520, and a mask part 530.

The high boost filter 510 plays a role of boosting high-frequency components of an image signal, which may have various filter forms. FIG. 6 shows various spatial filters, for examples, which plays a role of boosting high-frequency components of an image signal, wherein FIG. 6a shows a mask form in a high boost filter, FIG. 6b a mask form in a Laplacian filter, and FIG. 6c a mask form in a DoG (Difference of Gaussian) filter.

Figure 6A:
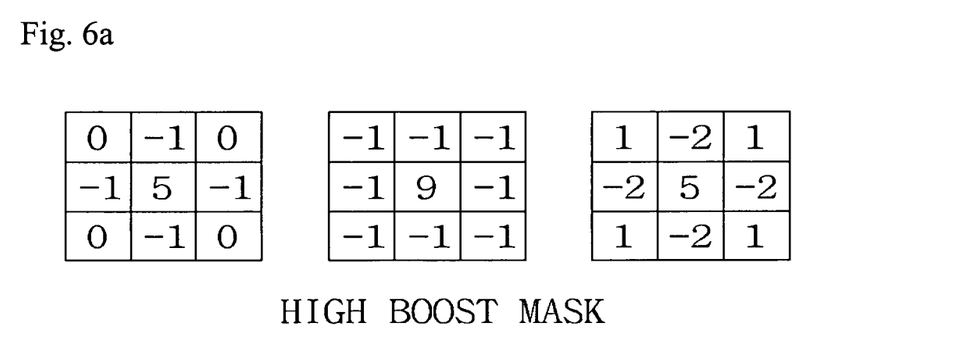
FIG. 6a shows a high boost filter.
Figure 6B:
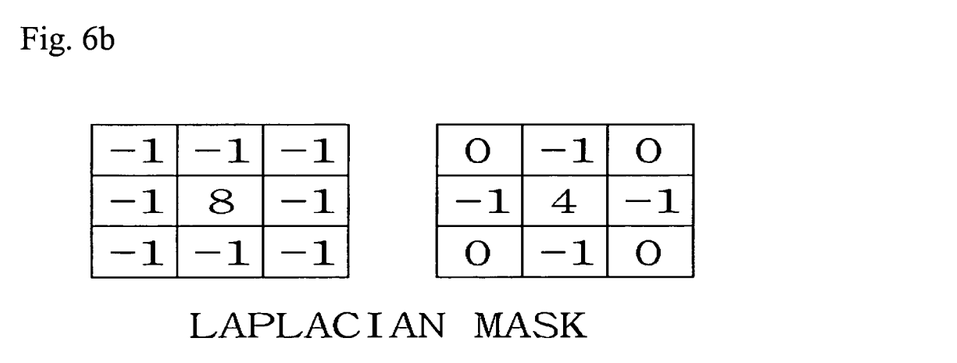
FIG. 6b shows a Laplacian filter.
Figure 6C:
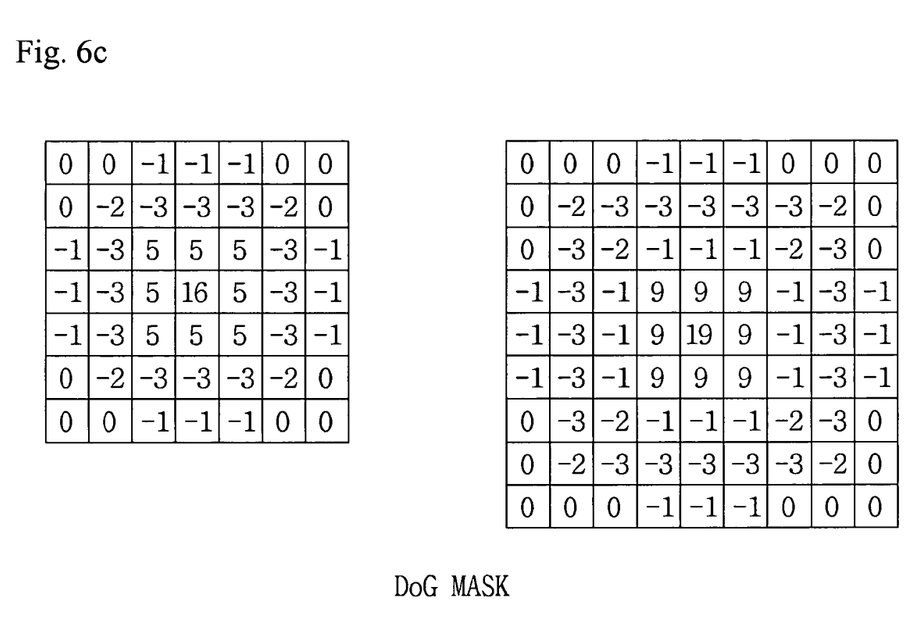
FIG. 6c shows a DoG (Difference of Gaussian) filter having 7×7 and 9×9 masks.
Figure 7A:
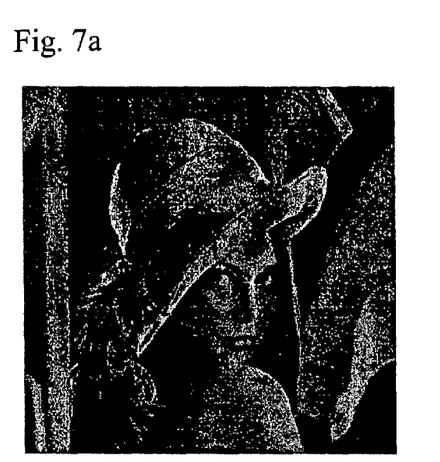
FIG. 7a is a view for showing an example of a watermarked image before filtering, and FIGS. 7b to 7d respectively show the results processed by a high boost filter, Laplacian filter, and DoG filter, for example.
Figure 7B:
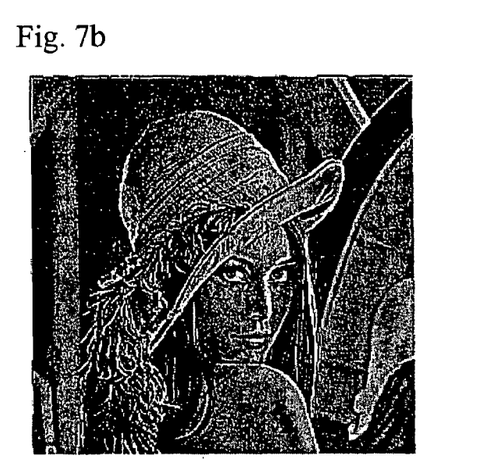
Figure 7C:
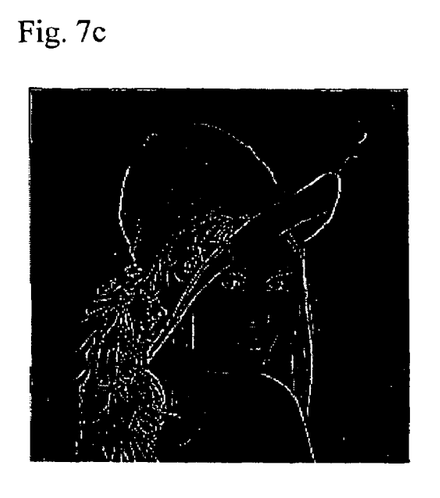
Figure 7D:
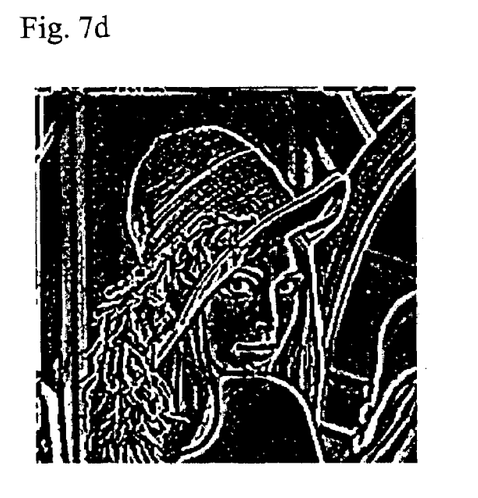

The high boost filter in FIG. 6a serves detecting a watermark, and plays a role of boosting a watermark signal. That is, it plays a role of reducing image component energy and increasing watermark signal energy. Further, the DoG filter is based on Formula 3 as follows.

$$DoG(x, y) = \frac{e^{-\frac{(x^2+y^2)}{2\sigma_1^2}}}{2\pi\sigma_1^2} - \frac{e^{-\frac{(x^2+y^2)}{2\sigma_2^2}}}{2\pi\sigma_2^2}$$ [Formula 3]

The image block addition part 520 plays a role of adding a watermarked image block by block as a watermark is embedded block by block in watermark embedding. Since the energy of image components nearly approaches an average by such block-by-block additions, but the watermark component gradually increases, the image block addition part 520 carries out a role of strengthening the watermark component.

Examples of the processing results by means of the above filters are shown in FIG. 7. FIG. 7a shows a watermarked image before filter-processing, FIG. 7b to FIG. 7c show the results processed by a high boost filter, Laplacian filter, and DoG filter, respectively.

Figure 8:
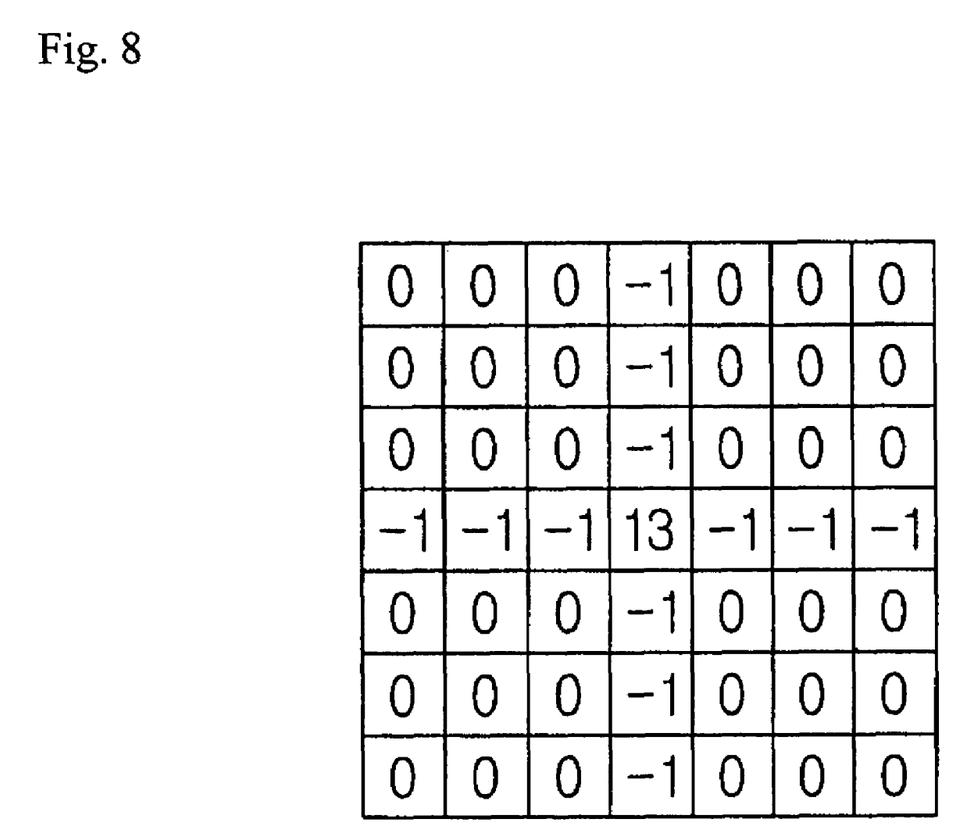
FIG. 8 is a view for showing an example of a mask form employed for an effective watermark detection.

Lastly, the mask part 530 for reducing the image component energy and strengthening the watermark component energy is used to strengthen a watermark. FIG. 8 shows an example of a filter in the mask part 530 used to strengthen a watermark signal.

As stated above, all the jobs accomplished in the high boost filter 510 of the pre-processing part 220, image block addition part 520, and the mask part 530 is to strengthen a watermark component of an image signal, which may be enough with at least any one of the jobs.

In the meantime, the watermark generation part 230 of the watermark detection apparatus 200 outputs a signal different from one outputted from the watermark generation part 120 of the watermark embedding apparatus 100. That is, the watermark generation part 120 in the watermark embedding apparatus 100 adds a two dimensional watermark signal generated based on a user key and an inherent key and carries out the inverse 2D-DCT, but the watermark generation part 230 in the watermark detection apparatus 200 performs the processing based on a structure shown in FIG. 9.

Figure 9:
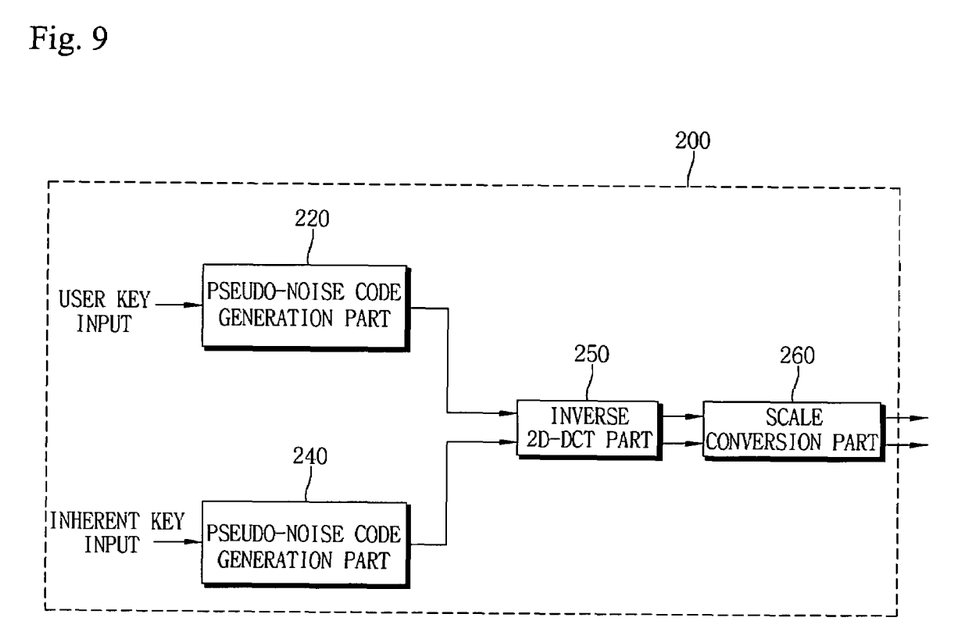
FIG. 9 is a block diagram for schematically showing a watermark generation part in a watermark detection apparatus of FIG. 1.

That is, the two two-dimensional pseudo-noise codes generated by the user key and inherent key in the respective pseudo-noise generation parts 220 and 240 are not added but inputted to the inverse 2D-DCT part 250 to be respectively transformed with an application of the inverse 2D-DCT transform, and a scale conversion part 260 scales a watermark size. In order to grasp whether a peak position appearing, during detecting a watermark, when detected by a user key and when detected by an inherent key are the same, pseudo-noise codes formed by a user key and an inherent key are not added during the detection process, but passes through the inverse 2D-DCT part 250 and the scale conversion part 260 respectively. Watermark signals are generated for each by doing so and inputted to the correlation calculation part 240 for calculating a correlation Corr by using Formula 4 as follows. A correlation between a watermark based on the inherent key and a watermarked image and a correlation between a watermark based on the user key and a watermarked image are respectively obtained.

$$Corr = IFFT2(FFT2(W_{img}) \times conj(FFT2(W_m)))$$ [Formula 4]

Here, $W_{img}$ denotes a watermarked image, that is, a signal past through the pre-processing step, and $W_m$ a watermark generated by a watermark generation part by using a user key and an inherent key and embedded in an image. IFFT2 denotes a two-dimensional inverse fast Fourier transform, FFT2 a two-dimensional fast Fourier Transform, and conj a complex conjugate.

The correlation calculations using the above Formula 4 are carried out by multiplying data obtained through the two-dimensional fast Fourier transform with respect to a watermarked image $W_{img}$ with data obtained through the two-dimensional fast Fourier transform with respect to a watermark $W_m$ generated by a user key or an inherent key from the watermark generation part 230, and then the inverse fast Fourier transform is applied to the multiplication to be converted into a spatial domain. As above, the transform into a frequency domain and the calculations based on the multiplication reduce watermark convolution calculations with respect to a watermarked image in the spatial domain, enabling faster data processings.

Figure 10:
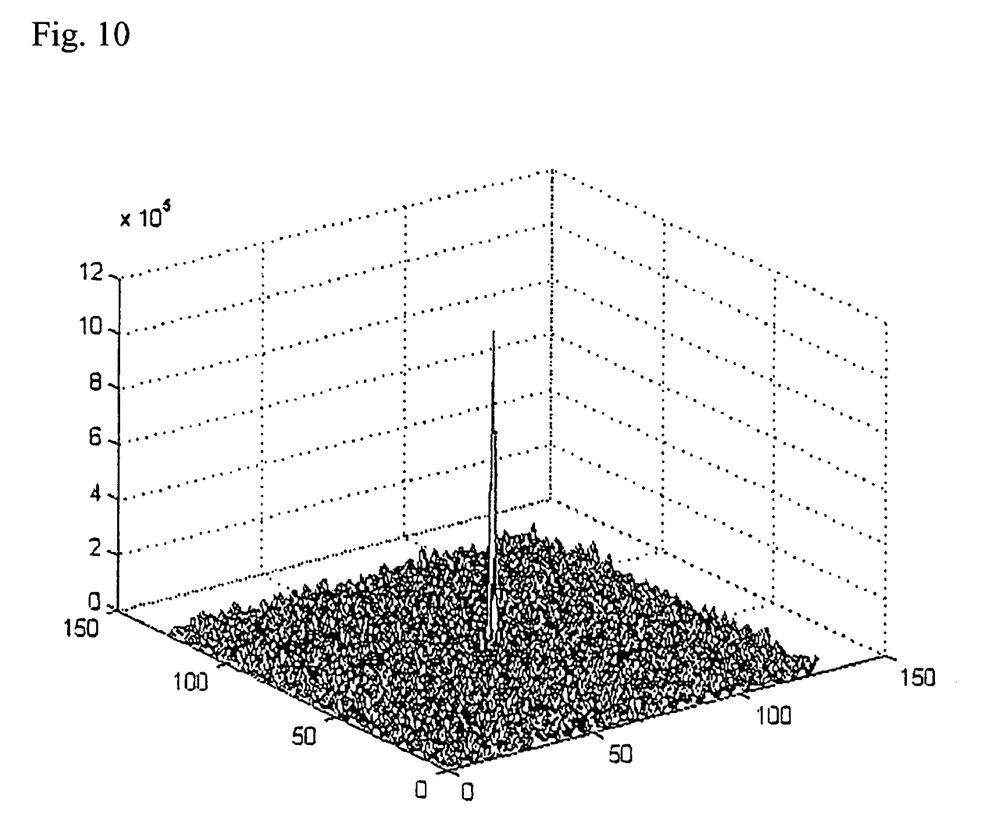
FIG. 10 is a view for showing a floated correlation calculated based on Formula 4 as to a presumptive case that a watermark is embedded.

FIG. 10 is a view for showing a floated correlation calculated based on Formula 4 as to a presumptive case that a watermark is embedded. A correlation obtained by formula 4 is not a certain value, but plural values in a two-dimensional sequence form, so such plural values are compared to enable a maximum peak value and its position to be obtained through a process as follows.

Figure 11:
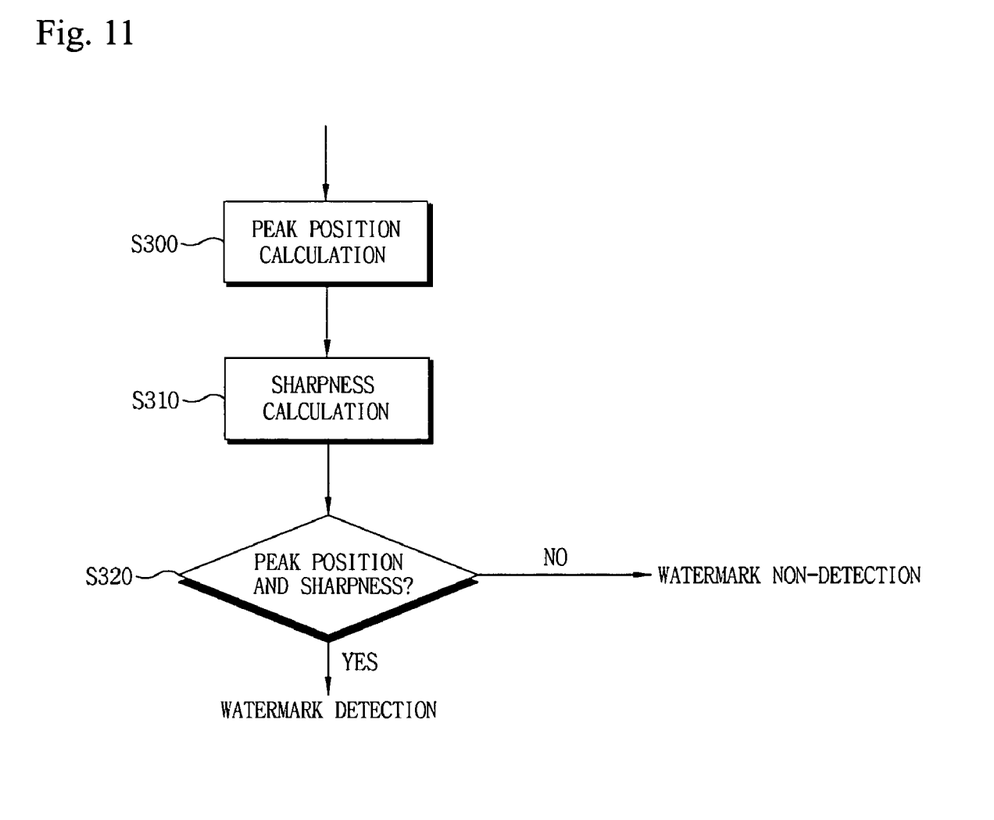
FIG. 11 is a view for showing operation flows of a watermark detection part of the watermark detection apparatus of FIG. 1.

The watermark detection part 250 checks, just as a watermark is generated through an inherent key and a user key in the watermark generation part 230 if peaks occur, as shown in FIG. 11, whether these two key values exist and the peaks occur at the same position (Step S300). A sharpness degree is calculated if the two peak positions are the same (Step S310). The calculation of the sharpness degree is to calculate a fourth moment (Kurtosis) K in Formula 5, check whether the value of K is more than a certain threshold value (Step S320), and determine that a watermark is detected when the two conditions are all satisfied.

$$K(x_1, \ldots, x_N) = \left\{ \frac{1}{N} \sum_{j=1}^{N} \left[ \frac{x_j - \bar{x}}{\sigma} \right]^4 \right\} - 3 \quad \text{[Formula 5]}$$

Here, $x_1, \ldots, x_N$ denotes a result value of a correlation between two watermarks Wm and Wimg, $\bar{x}$ an average of $x_1, \ldots, x_N$ and $\sigma$ a standard deviation.

The determination as to whether a value of K is more than a certain threshold value in the above procedure is to determine whether a watermark is embedded through a comparison between a peak value and a set threshold value since a peak appears high at an calculated value, in case that the watermark is embedded. In here, the threshold value is shown as a value allocated in a certain manner by experiments. But, when the condition of Step S320 is not satisfied, it is determined that a watermark is not detected.

INDUSTRIAL APPLICATION

As described above, the present invention relates to a method and a apparatus for embedding and detecting a watermark, which are designed to be able to do faster and more precise extractions in embedding and detecting the watermark, and enhance the robustness as to watermark signal variations by changing a watermark structure.

That is, the existing watermarking methods independently apply the spatial domain method and the frequency domain method for watermarking, but the present invention uses all the two methods to simultaneously satisfy the speed and invisibility of watermark embedding and the robustness of a watermark.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A digital watermark embedding method for embedding a digital watermark in an image signal that is not transformed into frequency domain, comprising steps of:
   using a user key and an inherent key to generate respective pseudo-noise codes;
   adding the pseudo-noise code generated based on the user key and the pseudo-noise code generated based on the inherent key;
   applying an inverse Discrete Cosine Transform to the added pseudo-noise codes to generate a digital watermark; and
   adding the digital watermark and an image signal that is not transformed into frequency domain.

2. The method as claimed in claim 1, further comprising a step of resampling the digital watermark to a certain size after the application of the inverse Discrete Transform.

3. The method as claimed in claim 2, wherein the resampling is accomplished in a size larger than the watermark.

4. The method as claimed in claim 2, wherein the addition of the digital watermark and the image signal includes steps of:
   dividing the image signal into a size of the watermark; and
   adding a divided image signal and a watermark channel by channel.

5. The method as claimed in claim 4, further comprising steps of:
   converting into a YIQ format the image signal inputted in an RGB format before adding the digital watermark and the image signal, the image signal having a 24-bit size, and the YIQ standing for Luminance(Y), In-Phase(I), and Quadrature(Q); and
   extracting a Y component from the converted YIQ format components, the Y component being added to the digital watermark.

6. The method as claimed in claim 4, wherein the image signal has a 24-bit size and the image signal inputted in an RGB format is added to the digital watermark for each of R, G and B channels.

7. The method as claimed in claim 5, further comprising a step of storing the image signal and the digital watermark-added image signal, wherein the storing step includes substeps of:
   adding the IQ components and the added image signal;
   converting the added signal into the RGB format; and
   storing the converted signal in a storage medium as a recordation signal.

8. The method as claimed in claim 4, further comprising a step of storing an image signal including the image signal-added digital watermark.

9. A digital watermark detection method for detecting a digital watermark embedded in an image signal that is not transformed into frequency domain, comprising steps of:
   using a user key and an inherent key to generate respective pseudo-noise codes;
   applying an inverse Discrete Cosine Transform to each of the pseudo-noise code generated based on the user key and the pseudo-noise code generated based on the inherent key;
   scaling the converted signal into a certain size and forming a digital watermark;
   calculating a correlation between the digital watermark and an image signal that is not transformed into frequency domain; and
   detecting a watermark embedded in the image signal from the correlation.

10. The method as claimed in claim 9, further comprising a step of, before calculating the correlation between the digital watermark and the image signal, strengthening a component of the digital watermark embedded in the image signal.

11. The method as claimed in claim 10, further comprising, before strengthening the component of the digital watermark embedded in the image signal, steps of:
    determining whether the image signal is a 24-bit signal;
    converting the inputted image signal of an RGB format into a YIQ format if the inputted image signal is in 24 bits; and
    extracting only a Y component from the components of the converted YIQ format.

12. The method as claimed in claim 11, wherein, if the image signal is not in 24 bits, the digital watermark component embedded in the image signal is strengthened without conversion.

13. The method as claimed in claim 10, wherein the step of strengthening the digital watermark component includes steps of:
    filtering high-frequency components of the image signal;
    adding the filtered image signal block by block; and
    carrying out a masking to reduce image component energy and increase watermark component energy in the image signal.

14. The method as claimed in claim 13, wherein the high-frequency component filtering is carried out with a high boost filter, Laplacian filter, or Different of Gaussian (DoG) filter.

15. The method as claimed in claim 9, wherein the correlation is calculated based on a following formula:

$$Corr=IFFT2(FFT2(W_{img})FFT2)W_m)))$$

here, $W_{img}$ denotes a watermark-embedded image, $W_m$ a watermark generated based on the user key and the inherent key, IFFT2 a two-dimensional inverse fast Fourier transform, FFT2 a two-dimensional fast Fourier Transform, and conj a complex conjugate.

16. The method as claimed in claim 9, wherein the watermark detection step includes substeps of:
   calculating a peak position from the correlation;
   calculation a sharpness degree of the peak; and
   determining whether the watermark is included in the image signal according to the peak position and the sharpness degree, the peak being generated based on the existence of the user key and the inherent key.

17. A digital watermark embedding apparatus for embedding a watermark in an image signal that is not transformed into frequency domain, comprising:
   a watermark generation means for generating the watermark; and
   a first addition means for adding the watermark to an image signal that is not transformed into frequency domain, the watermark generation means including:
   a) a first pseudo-noise code generation means for generating a pseudo-noise code based on a user key;
   b) a second pseudo-noise code generation means for generating a pseudo-noise code based on an inherent key;
   c) a first addition means for adding the pseudo-noise codes generated from the first and second pseudo-noise generation means; and
   d) a conversion means for generating a watermark by applying an inverse two-dimensional Discrete Cosine Transform (inverse 2D-DCT) to the added pseudo-noise code.

18. The apparatus as claimed in claim 17, further comprising a sampling means for resampling the watermark to a certain size.

19. The apparatus as claimed in claim 18, wherein the sampling means carries out the resampling to a size larger than the watermark.

20. The apparatus as claimed in claim 18, wherein the first addition means divides the image signal into the watermark size, and adds a divided image signal to the watermark for each channel.

21. The apparatus as claimed in claim 17, further comprising an image conversion means for converting a format of the image signal before adding the image signal and the watermark, the image conversion means including:
   a first determination means for reading header information of the image signal and determining whether the image signal is a 24-bit image;
   a first conversion means for converting the image signal of RGB format into a YIQ format if the image signal is the 24-bit image signal; and
   an extraction means for extracting only a Y component from the image signal converted to the YIQ format, the image signal being outputted to the first addition means without the conversion if the image signal is not the 24 bits.

22. The apparatus as claimed in claim 21, further comprising an image storage means for storing the image signal in which the watermark is embedded by the first addition means, the image storage means including:
   a first determination means for reading the head information of the image signal and determining whether the image signal is the 24-bit image;
   an addition means for adding the image signal in which the watermark of the Y component is embedded and the IQ components separated by the extraction means, if the image signal is the 24-bit image signal; and
   a second conversion means for converting a signal of the added YIQ format into the RGB format, the image storage means storing the processed image signal in a record medium.

23. A digital watermark detection apparatus for detecting a watermark included in an image signal that is not transformed into frequency domain, comprising:
   a pre-processing means for boosting a watermark included in an image signal that is not transformed into frequency domain;
   a watermark generation means for generating a watermark signal;
   a correlation means for calculating a correlation between the watermark-boosted image signal and the watermark signal generated by the watermark generation means; and
   a detection means for detecting a watermark included in the image signal according to a correlation result, the watermark generation means including:
   a) a first pseudo-noise code generation means for generating a pseudo-noise code based on a user key;
   b) a second pseudo-noise code generation means for generating a pseudo-noise code based on an inherent key;
   c) a conversion means for generating the watermark by applying an inverse two-dimensional Discrete Cosine Transform to each of the pseudo-noise codes generated by the first and second pseudo-noise code generation means; and
   d) a means for scaling the watermark to a certain size.

24. The apparatus as claimed in claim 23, wherein the pre-processing means includes:
   a filtering means for filtering frequency components of the image signal;
   a block addition means for adding the filtered image signal block by block; and
   a masking means for carrying out a masking in use of a certain form of mask to reduce image component energy from the image signal and boost watermark component energy embedded in the image signal.

25. The apparatus as claimed in claim 24, wherein the detection means determines whether the watermark is included in the image signal based on a position at which a peak occurs and a sharpness of the peak from the correlation obtained by the correlation means.

* * * * *